United States Patent [19]

Armor et al.

[11] 4,031,422

[45] June 21, 1977

[54] GAS COOLED FLUX SHIELD FOR DYNAMOELECTRIC MACHINE

[75] Inventors: Anthony F. Armor; Madabushi V. K. Chari; Henry W. Kudlacik, all of Schenectady, N.Y.; Paul Reece, Pittsfield, Mass.

[73] Assignee: General Electric Company, Schenectady, N.Y.

[22] Filed: Sept. 2, 1975

[21] Appl. No.: 609,390

[52] U.S. Cl. .............................. 310/256; 310/55; 336/60; 336/84

[51] Int. Cl.² ...................................... H02K 1/12

[58] Field of Search ............. 310/256, 52, 54, 58, 310/64, 65, 55, 260, 270; 336/60, 84, 84 M

[56] References Cited

UNITED STATES PATENTS

| | | | |
|---|---|---|---|
| 1,689,187 | 10/1928 | Pohl | 310/256 |
| 2,795,714 | 6/1957 | Baudry | 310/256 |
| 3,435,262 | 3/1969 | Bennett | 310/54 |
| 3,714,477 | 1/1973 | Gott | 310/256 |
| 3,808,489 | 4/1974 | Albright | 310/52 |

*Primary Examiner*—R. Skudy
*Attorney, Agent, or Firm*—John F. Ahern; James W. Mitchell

[57] ABSTRACT

An improved apparatus is provided to cool the flux shields of dynamoelectric machines. In one embodiment of this invention, cooling fins are attached to a flux shield at localized areas of heating of the flux shield referred to as hot spots to reduce the temperatures there to acceptable levels. These fins may be provided with a tapered portion which minimizes the fluid losses associated with the flow of cooling gas over the fins. In another embodiment of the present invention, an annular rim, bored to provide cooling gas passages therethrough, is fixed to the flux shield along an inner portion thereof, to effect the transfer of heat from the flux shield to a flow of the cooling gas through the passages. Finally, in a third embodiment of the present invention, an electrically non-conducting annular baffle is disposed around the flux shield adjacent an inner surface thereof to direct a flow of cooling gas across the inner surface of the flux shield thereby cooling the same.

6 Claims, 5 Drawing Figures

GAS COOLED FLUX SHIELD FOR DYNAMOELECTRIC MACHINE

BACKGROUND OF THE INVENTION

1. Field of the Invention

This invention relates generally to flux shields employed in dynamoelectric machines and more particularly to means for cooling such flux shields.

2. Description of the Prior Art

In operation, large dynamoelectric machines tend to produce relatively large quantities of stray flux in the end regions. This stray flux is produced by both the rotor and the end turns of the armature bars in the stator and includes axial components which tend to penetrate the end portions of the stator causing undesirable eddy current heating. It has been the practice to provide flux shields in the end regions of dynamoelectric machine stators to shield the machinery from such stray flux. An example of a flux shield is described and claimed in U.S. Pat. No. 3,714,477, Gott, assigned to applicant's assignee. The flux shield shown in the Gott patent is a copper annulus shaped to conform to an end flange. This end flange, together with an opposing end flange, clamps together a multiplicity of laminations forming the stator core to hold them in place. The flux shield being electrically conductive but having a low magnetic permeability, has circulating currents produced therein by the stray flux. These currents themselves produce a magnetic field which diverts the stray flux away from the stator core, thereby reducing undesirable eddy current losses in the end flange and other stator components. However, the currents circulating in the flux shield heat that member. Although modern dynamoelectric machines are internally cooled by a flow of cooling gas such as hydrogen, as the ratings of these machines increase with advanced technology, the heating within the flux shields employed therein may increase to an unsatisfactory level.

It is, therefore, an object of the present invention to provide an improved means for cooling the flux shields of large dynamoelectric machines without substantially increasing the fluid losses associated with the flow of cooling gas through the machines.

SUMMARY OF THE INVENTION

Briefly stated, the invention is practiced by providing an improved means to cool the flux shields of dynamoelectric machines. In one embodiment of this invention, cooling fins are provided at localized areas of heating of the flux shield referred to as hot spots, to reduce the temperatures there to acceptable levels. These fins may be provided with a tapered portion which minimizes the fluid losses associated with the flow of cooling gas over the fins. In another embodiment of the present invention, an annular rim, bored to provide cooling gas passages therethrough, is fixed to the flux shield along an inner portion thereof to effect the transfer of heat from the flux shield to a flow of the cooling gas through the passages. Finally, in a third embodiment of the present invention, an electrically non-conducting annular baffle is disposed around the flux shield adjacent to but spaced from an inner surface thereof to direct a flow of cooling gas across the inner surface of the flux shield thereby cooling the same.

DESCRIPTION OF THE PREFERRED EMBODIMENTS

Figure 1:
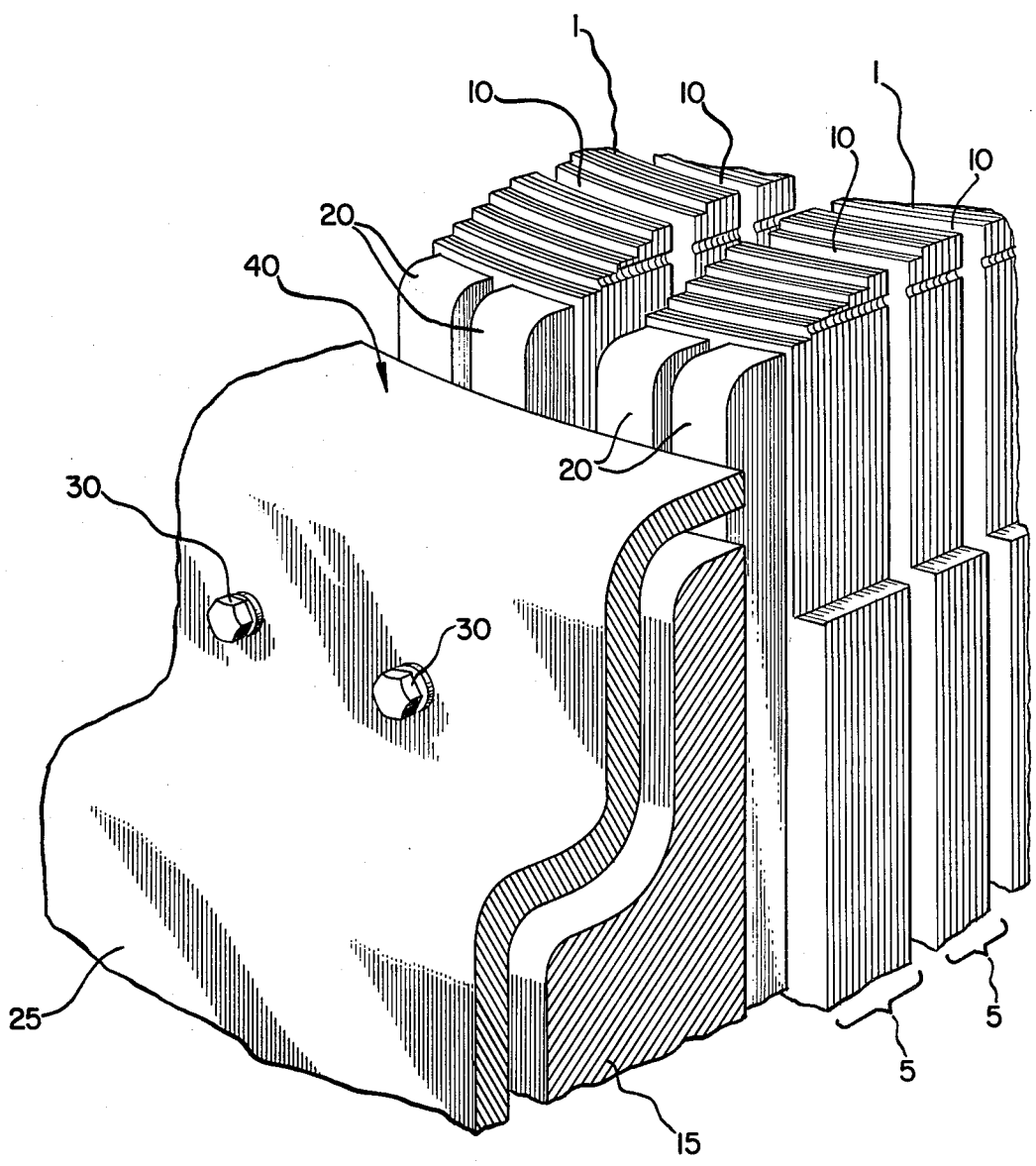
FIG. 1 is a perspective view of a portion of one end of a dynamoelectric machine stator core and shows a prior art flux shield.
Figure 2:
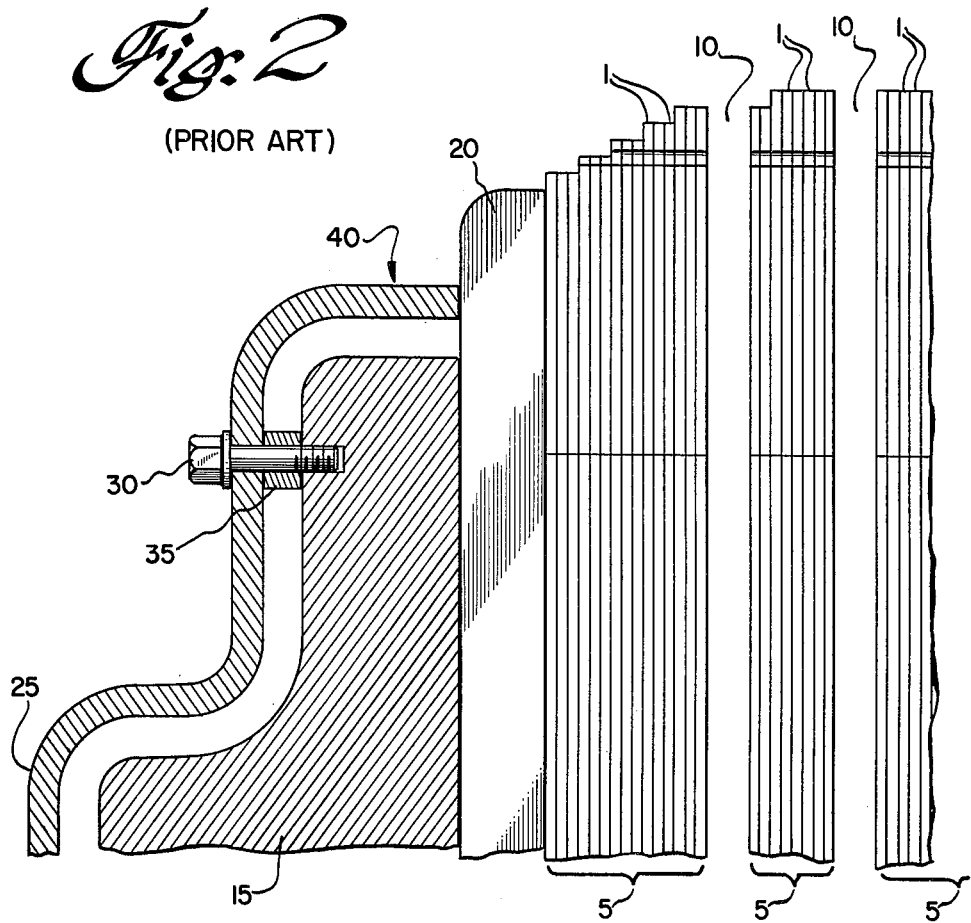
FIG. 2 is a cross-sectional view of the structure of FIG. 1 taken along the longitudinal axis of the stator core.

Referring now to FIGS. 1 and 2, there is shown a portion of a dynamoelectric machine stator core at the end thereof. The main stator core comprises a multiplicity of stacked laminations 1 of iron punchings arranged in packages 5, the packages separated by cooling gas ducts 10. A pair of end flanges, one of which is shown at 15, is provided at the ends of the core and compresses the laminations in an axial direction holding them in place. This axial compressive force is extended to the inner portions of the laminations by radially extending space blocks 20.

In order to minimize eddy current losses in the stator, an annular flux shield 25 is provided adjacent to and spaced from end flange 15 and attached thereto and held in place thereon by a plurality of bolts 30. Each bolt extends through an insulating spacer 35 which maintains the flux shield in a spaced relation with the end flange.

Stray flux from the rotor and armature of the dynamoelectric machine induces currents in flux shield 25 which is a generally annular, non-magnetic member formed from a material having a high electrical conductivity. The currents induced in the flux shield generate their own magnetic field which acts to repulse the stray flux, thereby reducing eddy current losses in the end flange and other portions of the stator.

Modern dynamoelectric machines of high ratings have associated with them high stray flux densities in the end regions of the stators. These high stray flux densities in turn produce large circulating currents in the flux shields which tend to excessively heat the flux shields especially at radially inner portions 40 thereof.

Figure 3:
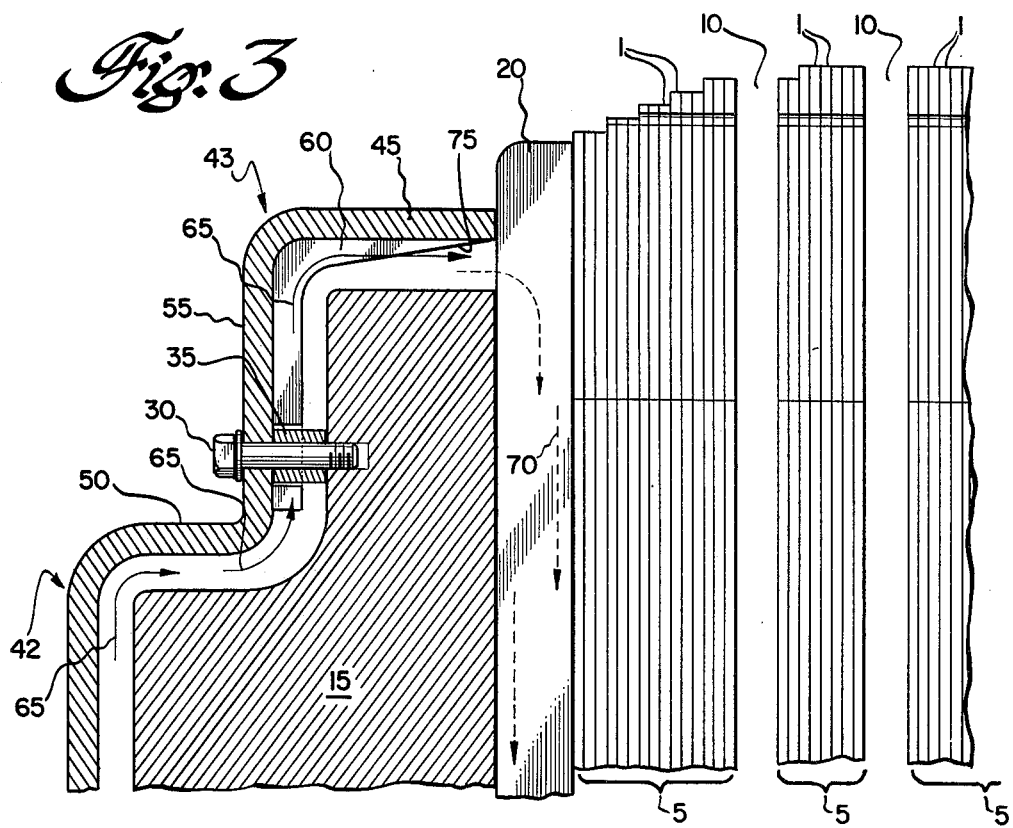
FIG. 3 is a cross-sectional view of an end portion of a dynamoelectric machine stator showing a first embodiment of the present invention.

In accordance with one embodiment of the present invention, flux shields are provided with means to effect a transfer of such excessive heat to a flow of cooling gas between the flux shield and the end flange. Referring now to FIG. 3, there is shown a flux shield 42 generally corresponding to the flux shield shown in FIG. 2. An inner portion 43 of this flux shield includes an inner rim 45, an outer rim 50 and a connecting web portion 55 disposed therebetween. To cool localities of elevated temperature or hot spots associated with the inner portion 43 of flux shield 42, a plurality of cooling fins one of which is shown at 60, are attached thereto by brazing or similar methods along inner rim 45 and web portion 55. Although fin 60 is shown as extending along both inner rim 45 and web portion 55, it may only be required to locate the fins along inner rim 45 should the heating problems associated with the flux shield so dictate.

Should it be necessary to locate a cooling fin at an area where flux shield 25 is bolted to flange 15, material may either be removed from the fin 60 to accommodate the spacer 35 or the spacer may be machined down to accommodate the fin. In either case, a suitable gas passage between fin 60 and space 35 will be provided insuring the effectiveness of the cooling fins.

Means for circulating cooling gas through the dynamoelectric machine are provided and comprise large fans (not shown) which rotate with the dynamoelectric machine rotor. The gas circulation between flux shield 42 and end flange 15 is indicated by arrows 65. Upon exiting the area between end flange 15 and flux shield 42 the cooling gas is turned 90° and flows outwardly between space blocks 20 as indicated by arrows 70. To minimize the fluid losses associated with this 90° turn in the flow of cooling gas, fins 60 in this embodiment are provided with tapered portions 75 at the ends thereof closest to space blocks 20. The fins of the present invention will, of course, eliminate hot spots in the flux shield without employing a tapered portion therein but the tapered construction will facilitate the flow of cooling gas thereby improving the cooling of the flux shield.

It can be seen then, that the provision of fins 60 at hot spots of flux shield 42 effects an increase in the surface area of the flux shield which is wetted by the cooling gas thereby increasing the amount of heat transferred to the cooling gas from the flux shield without significantly adding to the fluid losses associated with the flow of cooling gas through the dynamoelectric machine. The tapered fin construction minimizes the fluid losses associated with the 90° turn in the flow of cooling gas.

Figure 4:
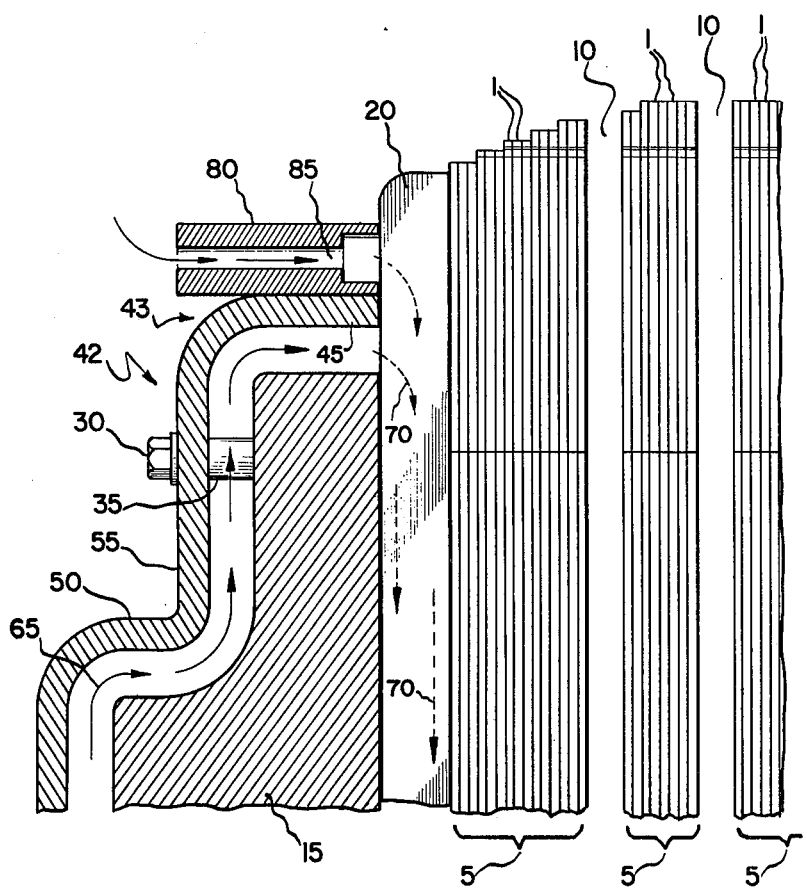
FIG. 4 is a cross-sectional view of an end portion of a dynamoelectric machine stator showing a second embodiment of the present invention.

Referring now to FIG 4, there is shown an alternate embodiment of the present invention wherein the inner portion 43 of flux shield 42 is cooled by the provision of an annular rim 80 attached to inner rim 45 of flux shield 43 by brazing or any other suitable method. Rim 80 is formed from a high heat conducting material and is bored at a plurality of locations forming a plurality of circumferentially spaced cooling passages, one of which is shown at 85. These passages effectively increase the surface area of flux shield 42 wetted by the cooling gas. In this form of the invention, in addition to the flow of cooling gas between the flux shield and the end flange as shown in FIG. 3 an additional flow of cooling gas is provided through passages 85 and into the passages between space blocks 20 as shown by arrows 70. It can be seen then that flows of cooling gas pumped through passages 85 and pumped between flux shield 42 and flange 15 will effectively cool any hot spots located at the inner portion 43 of the flux shield. After cooling the flux shield 42, the gas flowing through cooling passages 85 and between flux shield 42 and flange 15 is turned 90° and flows between space blocks 20. It is then subsequently cooled by suitable gas coolers. Cooling passages 85 provided in rim 80 do not substantially increase the fluid losses associated with the flow of cooling gas through the dynamoelectric machine, but do provide an effective means of cooling any hot spots located at the inner portion of the flux shield.

Figure 5:
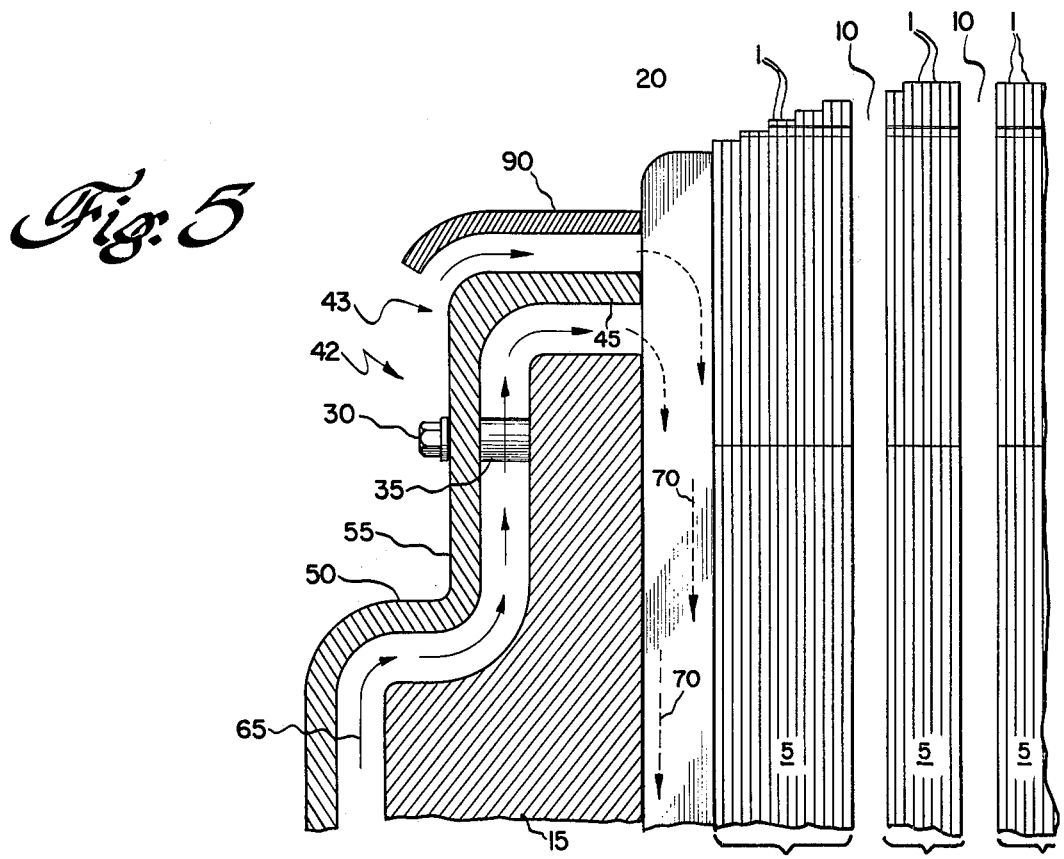
FIG. 5 is a cross-sectional view of an end portion of a dynamoelectric machine stator and shows a third embodiment of the present invention.

Referring now to FIG. 5, there is shown a third embodiment of the present invention wherein a generally annular baffle 90 is spaced from and generally concentric with inner rim 45 of flux shield 42 and mounted on space blocks 20 in any suitable manner such as by bonding. Baffle 90 is formed from a suitable electrically non-conducting material and directs a flow of cooling gas over the inner surface of inner rim 45. It can be seen then that the provision of baffle 90 and a flow of cooling gas between that member and flux shield 42 in addition to the flow of cooling gas between flux shield 42 and the flange 15 greatly increases the wetted area of the inner portion 43 of the flux shield thereby increasing the amount of heat transferred from the flux shield to the cooling gas to maintain the temperature of the flux shield within acceptable limits. Both the flows of cooling gas between baffle 90 and flux shield 42 and between flux shield 42 and flange 15 are turned 90° after cooling the flux shield and follow passages between space blocks 20 and are subsequently cooled. The fluid losses associated with the additional flow of cooling gas between baffle 90 and flux shield 42 are minimal as were the fluid losses associated with the gas flow around the fins and through the cooling passages as shown in the first two embodiments of the present invention.

Therefore, it can be seen that the present invention provides a means for maintaining the temperature of the flux shield in a dynamoelectric machine within acceptable limits without significantly adding to the fluid losses associated with the flow of cooling gas through the stator of the machine. This improved cooling of the flux shield eliminates the hot spots in the flux shield as a limiting factor in the outputs which modern day dynamoelectric machines are capable of producing.

While there have been shown and described specific embodiments of the gas cooled flux shield of this invention, it will be apparent to those skilled in the art that modifications may be made without departing from the substance of this invention, and it is intended by the appended claims to cover such modifications as come within the spirit and scope of this invention.

We claim:

1. A dynamoelectric machine of the type including a gas cooled stator core comprising a plurality of laminations held in assembled relationship by end flanges applying a compressive loading thereto and an annular flux shield for reducing the eddy current losses in the end flanges and the stator cores, the flux shield including an inner rim disposed adjacent to and spaced from a respective end flange for providing a passage for the flow of cooling gas therebetween and including the improvement comprising:

means for circulating cooling gas radially through the passage between said flux shield and said end flange, and means disposed adjacent the inner rim of said flux shield for increasing the amount of heat transfer surface area between said flux shield and said cooling gas.

2. The dynamoelectric machine as defined in claim 1, wherein said means for increasing the amount of heat transfer surface area between said flux shield and said cooling gas comprises:

a plurality of fins each disposed along and fixed to the inner rim of the flux shield within the passage therebetween at localities of elevated temperatures thereby increasing the surface area of the inner rim wetted by the cooling gas.

3. The dynamoelectric machine of claim 2, wherein said flux shield further includes a web portion connected to said inner rim and wherein said fins also extend along and are fixed to the web portion of the flux shield in the passage between the flux shield and the end flange at localities of elevated temperatures thereby increasing the surface area of the web portion wetted by the cooling gas.

4. The dynamoelectric machine of claim 2, wherein said fins are tapered in the direction of cooling gas flow for minimizing the fluid losses associated with the flow of cooling gas past the fins upon exiting the passages between the flux shield and the end flange.

5. The dynamoelectric machine of claim 1, wherein said means for increasing the amount of heat transfer surface area between said flux shield and said cooling gas comprises:

an annular rim of material having a high heat conductivity, fixed to the inner rim of the flux shield, said annular rim being bored at a plurality of locations to provide circumferentially spaced passages for the flow of cooling gas thereby increasing the surface area of the inner rim wetted by radially flowing the cooling gas.

6. The dynamoelectric machine as defined in claim 1, wherein said means for increasing the amount of heat transfer surface area between said flux shield and said cooling gas comprises:

a generally annular baffle spaced from and generally concentric with the inner rim of the flux shield, said baffle directing a flow of cooling gas across the inner rim of the flux shield and radially outwardly between said end flanges and said flux shield.

* * * * *